US012683301B2

(12) United States Patent
Pirlo

(10) Patent No.: US 12,683,301 B2
(45) Date of Patent: Jul. 14, 2026

(54) INSULATION DISPLACEMENT CONNECTION SYSTEM

(71) Applicant: Luca Pirlo, Manerba del Garda (IT)

(72) Inventor: Luca Pirlo, Manerba del Garda (IT)

( * ) Notice: Subject to any disclaimer, the term of this patent is extended or adjusted under 35 U.S.C. 154(b) by 312 days.

(21) Appl. No.: 18/682,187

(22) PCT Filed: Sep. 15, 2022

(86) PCT No.: PCT/IB2022/058687
§ 371 (c)(1),
(2) Date: Feb. 8, 2024

(87) PCT Pub. No.: WO2023/047253
PCT Pub. Date: Mar. 30, 2023

(65) Prior Publication Data

US 2024/0347936 A1 Oct. 17, 2024

(30) Foreign Application Priority Data

Sep. 22, 2021 (IT) ........................ 102021000024353

(51) Int. Cl.
*H01R 4/247* (2018.01)
*H01R 4/2407* (2018.01)
*H01R 4/26* (2006.01)
*H01R 103/00* (2006.01)

(52) U.S. Cl.
CPC ........... *H01R 4/247* (2013.01); *H01R 4/2407* (2018.01); *H01R 4/26* (2013.01); *H01R 2103/00* (2013.01)

(58) Field of Classification Search
CPC ......... H01R 4/247; H01R 4/2407; H01R 4/26
USPC .................................................. 439/395, 396
See application file for complete search history.

(56) References Cited

U.S. PATENT DOCUMENTS

| | | | |
|---|---|---|---|
| 4,026,013 | A | 5/1977 | Hughes |
| 4,152,686 | A | 5/1979 | Hughes |
| 4,749,365 | A | 6/1988 | Magnifico et al. |
| 6,908,331 | B2 | 6/2005 | Brown |
| 8,475,201 | B2 | 7/2013 | Pirlo |

(Continued)

FOREIGN PATENT DOCUMENTS

| | | | |
|---|---|---|---|
| DE | 3830763 | A1 | 3/1990 |

OTHER PUBLICATIONS

International Search Report, issued in PCT/IB2022/058687, mailed Jan. 17, 2023, Rijswijk, NL.

*Primary Examiner* — Gary F Paumen
(74) *Attorney, Agent, or Firm* — ArentFox Schiff LLP; Michael Fainberg

(57) ABSTRACT

An insulation displacement connection system having a connection terminal, a pocket for accommodating the connection terminal, and an enameled wire spirally wound around a pin is provided. The pocket is frontally delimited by the pin, at the back by a rear wall and laterally by a pair of side guide walls suitable for guiding the connection terminal during an insertion of the connection terminal into the pocket. The connection terminal is provided with a single tab shaped to elastically intercept the pin so as to exert an abrasive action on the enameled wire during the insertion of the connection terminal into the pocket and to elastically bias the enameled wire to abut against the pin upon the insertion of the connection terminal into the pocket, ensuring an electrical connection between the single tab and the enameled wire.

20 Claims, 6 Drawing Sheets

(56) References Cited

U.S. PATENT DOCUMENTS

| | | | | |
|---|---|---|---|---|
| 9,496,644 | B2 * | 11/2016 | Bragg | H01R 13/4536 |
| 9,515,437 | B2 * | 12/2016 | Bragg | H01R 13/4536 |
| 9,608,379 | B1 * | 3/2017 | Riley | H01R 13/6469 |
| 9,627,827 | B2 * | 4/2017 | Bragg | H01R 24/64 |
| 9,831,606 | B2 * | 11/2017 | Riley | H01R 13/6469 |
| 9,859,663 | B2 * | 1/2018 | Sparrowhawk | H01R 4/24 |
| 10,135,207 | B2 * | 11/2018 | Cui | H01G 4/38 |

* cited by examiner

INSULATION DISPLACEMENT CONNECTION SYSTEM

CROSS-REFERENCE TO RELATED APPLICATIONS

This application is a National Phase Application of PCT International Application No. PCT/IB2022/058687, having an International Filing Date of Sep. 15, 2022 which claims priority to Italian Application No. 102021000024353 filed Sep. 22, 2021, each of which is hereby incorporated by reference in its entirety.

FIELD OF THE INVENTION

The present invention relates to an insertion connection system; in particular, the present invention relates to a mechanical connection system of the "IDC" (insulation displacement connectors) type for enameled wires, which have small pocket sizes and are applicable to a wide range of wires.

BACKGROUND OF THE INVENTION

Insertion connection also called insulation displacement connection or simply IDC—is widely used by industry in all areas where there is an electrical wire to be terminated/connected directly with a terminal. In this particular case, there is great demand for the use of insulation displacement connection systems in the automotive industry.

In particular, reference is made to enameled copper wires, i.e., wires covered with a layer of electrical insulation which must be removed from the ends of the wire to allow its electrical connection to the relevant terminal.

The insertion connection allows for an electrical connection which, combined with ease of use and application, makes it possible to replace the cleaning of the enameled wire and subsequent soldering.

In addition to increased convenience of use, the insertion connection also provides a "gas-tight" seal.

In other words, insertion connection is a viable alternative to traditional soldering and/or crimping systems because it allows simultaneous removal of the insulation layer and mechanical and electrical connection of the wire.

The main connection systems currently on the market will be analyzed below.

A first embodiment according to the prior art, known to a person skilled in the art as a "splice," consists in joining two enameled wires by way of a permanent mechanical deformation process. The operation is completely manual and consists in inserting the enameled wires inside the terminal, known as the "splice", which is provided with a plurality of notches/points. By folding the side with the notches/points over the wires, the enamel is broken and the electrical connection between the electrical wires is achieved. In other words, by crimping the terminal on itself, the enamel of the wires is broken and they are electrically connected to each other.

Disadvantageously, this is a manual operation that requires different terminal sizes depending on the diameters of the wires to be connected. In addition, splice technology cannot be automated and is not recommended for "capillary" wires.

It should be noted that the term "capillary" means wires with a diameter comparable to that of a hair, that is to say, with a diameter of less than 0.1 mm.

A second embodiment, described in U.S. Pat. Nos. 4,026,013A, 4,152,686, consists of a combined system comprising a pocket and a terminal, wherein the enameled wire is inserted into the plastics pocket and is then attached at a special end.

The terminal is inserted inside the pocket by means of a special applicator and undergoes deformation against the pocket walls during the insertion process. In other words, the terminal is shaped by the pocket itself during its insertion inside the pocket. The terminal is provided with a plurality of notches/tips, facing the wire, which are suitable for breaking the enamel during insertion into the pocket. Upon completion of the insertion, the terminal is locked inside the pocket to ensure electrical contact between the wire and terminal.

Disadvantageously, this solution requires that the dimensional tolerances for the pocket be extremely small. In addition, the pocket is bulky and not easy to make; the size of the terminal also changes depending on the diameter of wire to be connected. Given the size of the system, its application remains limited to technical sectors where the need for miniaturization and reduction of the overall dimensions is not yet a priority.

An additional solution provided by the prior art is the crimp-and-solder terminal system. This system involves inserting the enameled wire inside a terminal tab which has special grooves in it. By closing the tab against the terminal and simultaneously soldering the tab against a wall of the terminal, the system is locked in place. This solution may also be automated; however, it is mainly used for "coarse" wires with high current transmissions.

Thus, the disadvantages of this system are the pre-shaping of the tab, which is necessary to prepare it for subsequent soldering, the soldering process itself, and the restricted application to "coarse" wire diameters.

A still further solution provided by the prior art is insertion connection systems, wherein the enameled wire is covered by the terminal fins during its insertion inside the terminal. Such systems are, for example, known from U.S. Pat. Nos. 4,749,365; 6,908,331. The limitation of use of these terminals and applications lies in the diameter of the wire used and the shape of the terminal. In fact, in the solutions from the prior art, the terminal fins enter over the wire, which is housed in a special seat/groove, and, for diameters below a certain size, the enameled wire must be held taut (in order to be able to allow the terminal to be used and ensure the position of the wire during the insertion process). In addition, such systems do not allow the use of wires that are too small because the force that the fins exert on the wire must still be less than the shear strength of the wire: this defines the minimum limit of enameled wire for the use of both terminals. In addition, the system, by its operation, cuts the enameled wire and reduces its cross section, compromising in some cases the application for products that are particularly stressed by thermal shock or vibration, such as in automotive applications.

Lastly, a final solution provided by the prior art is described in patent U.S. Pat. No. 8,475,201, filed in the name of the same applicant, in which the mechanical insertion contact system provides an electrical connection between an enameled wire and a terminal inserted into a special seat. However, unlike the other systems, the enameled wire is wound at the end and beginning of its winding on a special pin positioned centrally at the insertion seat. The terminal is inserted over the pin, and during insertion the fins drag over the enameled wire and remove the enamel, allowing electrical contact with the copper wire. Given the special shape of these fins, they hold the wire taut once they are in position and ensure continuous electrical contact over time. This system covers a wide range of wires, even capillary wires, for example with a diameter of 0.03 mm.

Disadvantageously, even this solution may be too large for some products such as coils, where the wire range that is normally required is small, that is to say, the wire size-to-product ratio is extremely small.

Thus, the solutions listed above are still too bulky and fail to meet the miniaturization requirements that are gradually becoming increasingly important in the industrial world. In addition, there is a need for a displacement connection capable of connecting the enameled wires without reducing the current flow cross section, and of ensuring a reliable electrical "gas-tight" connection between the wire and the terminal over time, without being bound to the resistance of the wire to shear stress during terminal insertion and taking into account the dimensional production variables of the system components.

SUMMARY OF THE INVENTION

Therefore, the problem addressed by the present invention is that of providing a system for insertion connection that overcomes the disadvantages described with reference to the prior art.

These disadvantages and limitations are solved overcome by an insulation displacement connection system as described and claimed herein.

Embodiments of the insulation displacement connection system according to the present invention are also described.

BRIEF DESCRIPTION OF THE FIGURES

Further features and advantages of this invention will become more apparent from the following detailed description of preferred, non-limiting embodiments thereof, in which.

DETAILED DESCRIPTION

Figures 1, 1A, 1B:
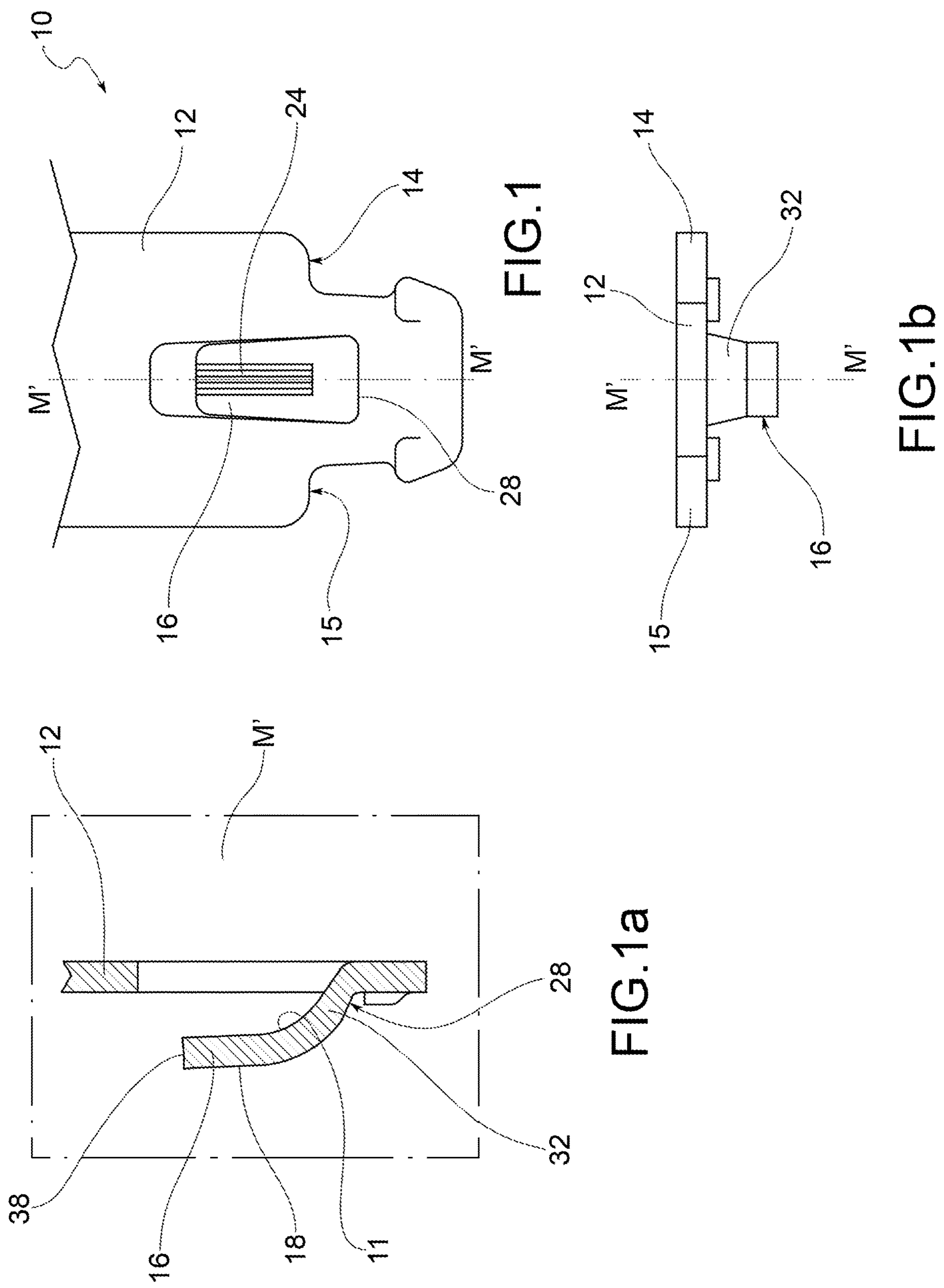
FIG. 1 is a front view of a connection terminal.
FIG. 1*a* is a cross-sectional view of the connection terminal from FIG. 1, said cross section being taken along a terminal midplane.
FIG. 1*b* is a bottom view of the connection terminal from FIG. 1.

In the following description, elements common to the various embodiments represented in the drawings are indicated with the same reference numerals.

In said drawings, reference sign 100 has been used to denote an insulation displacement connection system, for example an "IDC"-type connection system, according to the invention as a whole.

Such an insulation displacement connection system 100 comprises a connection terminal 10, a pocket 81 suitable for accommodating the connection terminal 10, and an enameled wire 20 spirally wound and at least partly accommodated in said pocket 81.

The pocket 81 comprises a pin 85 on which said wire 20 is wound.

Preferably, the pin 85 is made of a material belonging to the family of polymers.

The pin 85 is delimited by side walls 87, 89 which support the enameled wire during the winding of the wire 20 onto the pin 85. In addition, the pin 85 comprises a midplane M-M, and said midplane M-M is preferably also a plane of symmetry for the pocket 81. In the present case, the pin 85 lies substantially along the plane of symmetry M-M.

The pocket 81 is frontally delimited by the pin 85, at the back by a rear wall 84 and laterally by a pair of side guide walls 91, 92 suitable for guiding the connection terminal 10 during the insertion thereof into the pocket 81.

Preferably, these side guide walls 91, 92 comprise respective bevels 83; 82 to facilitate the entry of the terminal 10 inside the pocket 81.

The connection terminal 10 is provided with a single tab 16 shaped to elastically intercept the pin 85 so as to exert an abrasive action on the enameled wire 20 during the insertion of the connection terminal 10 into the pocket 81 and so as to elastically bias the wire 20 to abut against the pin 85 upon the insertion of said terminal 10 into the pocket 81, thus ensuring the electric connection between the single tab 16 and the wire 20.

The single tab 16 comprises an outer side 18 suitable for intercepting the wire. Said outer side 18 has a shaped surface 24 which directly interfaces with the enameled wire. The single tab 16 further comprises a terminal midplane M'-M' suitable for being coplanar to the midplane M-M.

For example, the shaped surface 24 is obtained by an embossing operation so as to produce pockets suitable for interfering with the enameled wire 20.

The pin 85, the rear wall 84 and the pair of side guide walls 91, 92 delimit a cavity 96 for accommodating the connection terminal 10, in particular the tab 16.

Advantageously, the pocket 81 has only one cavity 96.

In an embodiment, the connection terminal 10 comprises a body 12 and the single tab 16. The tab 16 extends from the body 12 so as to remain facing it.

The outer side 18 of the single tab 16 has, along the extension thereof, at least a partly curvilinear development having concavity directed towards the body 12 of the terminal 10.

Preferably, the tab has an inner side 11 opposite the outer side 18, where a reinforcing rib 30 is arranged to strengthen the tab 16 without compromising its elasticity.

According to one embodiment, the at least partially curvilinear development of the outer side 18 of the tab 16 has an arc of parabola shape.

In accordance with an embodiment, the tab 16 extends between a connection portion 28 and a free end 38. Said connection portion 28 connects the tab 16 to the body 12 so as to allow the tab 16 to elastically bend, pivoting on the connection portion 28, for example said connection portion 28 comprises an arc of circumference 32.

Preferably, the at least partly curvilinear development of the outer side 18 is such as to increase the mutual distance between the tab 16 and the body 12, moving from the connection portion 28 towards the free end 38 of the tab.

According to an embodiment, the tab 16 has, in the vicinity of the free end 38, a development which is substantially parallel to body 12.

In accordance with a preferred embodiment, the shaped surface 24 comprises a plurality of contact areas 54 alternated by a plurality of supporting areas 64. The contact areas 54 comprise contact tips, for example alternating ridges and depressions, where said contact tips are obtained by molding and are suitable for breaking the enamel to allow the electrical connection between the wire 20 and the terminal 10.

The supporting areas 64 are portions of smooth surface which are configured as supporting points for the wire 20.

In an embodiment, the shaped surface 24 extends from the connection portion 28, in particular from the arc of circumference 32, up to the free end 38.

Overall, the tab 16 has a shape that facilitates the insertion of the terminal 10 into its special pocket 81, so that the insulation of the enameled wire 20 is removed and the connection is maintained over time, said tab acting as a spring on the wire 20 and holding it taut.

According to an embodiment, the terminal 10 also has a pair of pocket engagement surfaces 14, 15 oriented orthogonally to the terminal midplane M'-M' and suitable to ensure the correct positioning of the terminal 10 in the pocket 81. In the present case, these pocket engagement surfaces 14, 15 are suitable for contacting a pair of stop surfaces 90, 93 formed on the pocket 81.

Specifically, this pair of stop surfaces 90, 93 is connected to the pair of side guide walls 91, 92 by means of the corresponding bevels 83;82.

Preferably, the pin 85 has a polygonal-shaped cross section, for example a quadrangular cross section, where the side walls 87, 89 are connected to each other by connecting walls 77, 79. The side wall 87 of said side walls 87, 89 is counter-shaped with respect to the outer side 18 so as to ensure a uniform support for the wire 20, which is coaxially wound around the pin 85, during the insertion of the terminal 10.

Due to the fact that the outer side 18 of the tab 16 is counter-shaped with respect to the side wall 87 of the pin 85, and jointly with respect to the shape of the tab 16, the enameled wire 20 is pressed against the pin 85 in a gradual, progressive and uniform manner. In this way, it is possible to abrade the enamel coating without cutting the wire, and thus an insulation displacement connection may be used even on enameled wires having small diameters.

Figure 6:
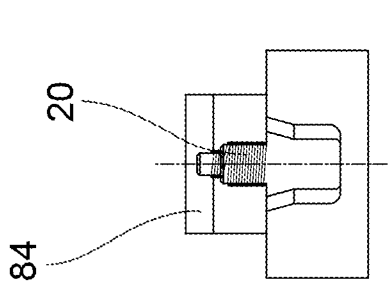
FIGS. 6-6*d* show cross-sectional views of the sequence of insertion of the connection terminal into the corresponding pocket.
Figure 6A:
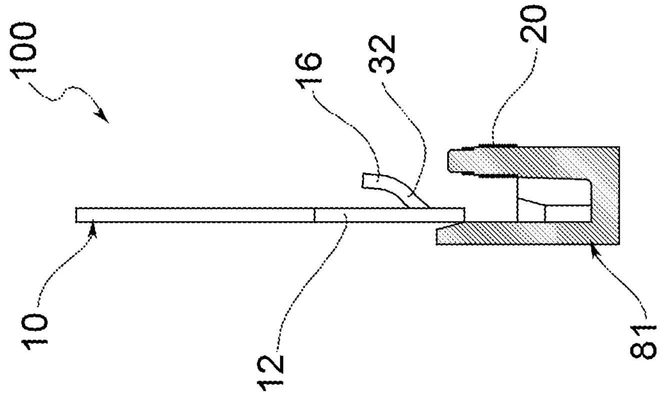
Figure 6B:
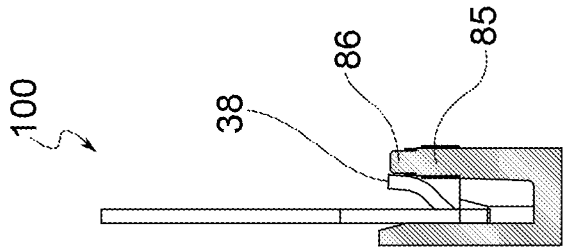
Figure 6C:
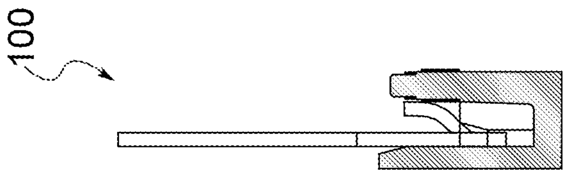
Figure 6D:
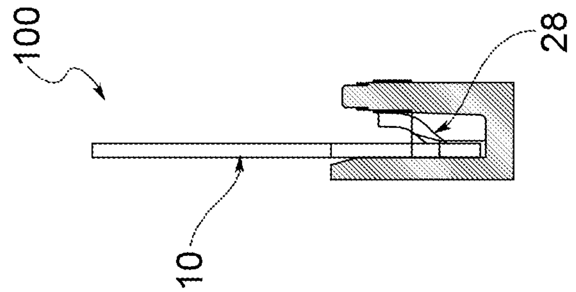

FIGS. 6-6*d* illustrate how the enameled wire is abraded and crushed at least partially by the tab, although cutting of the wire itself is avoided due to the particular geometric shape of the tab combined with the shape of the pin 85.

In an embodiment, the pin 85 comprises an upper pin 86 which defines the start and/or end position of the winding of the wire 20.

Preferably, the upper pin 86 is delimited by shaped walls suitable for locking the wire 20 during the winding so that the wire 20 does not unwind.

According to an embodiment, the upper pin 86 has a quadrangular shape with respect to a section plane which is perpendicular to the midplane M-M.

In an embodiment, the upper pin 86 has a reduced cross section than the one defined by the side walls 87, 89, and said reduced cross section of the upper pin 86 is such as to facilitate the work of the tab 16 during the insertion of the terminal 10 up to the operating position. The term "operating position" means the position of electrical contact between the wire 20 and the terminal 10, that is to say, after the terminal has been inserted into the pocket, the wire enamel has been removed from the shaped surface, and the electrical connection has been made.

In accordance with an embodiment, the pin 85 is delimited at the bottom by a pair of support walls 94, 95 which are configured as a support base for the enameled wire 20. Said pair of support walls 94, 95 provides a stop for the wire spirally wound around the pin 85 and prevents the enameled wire from laterally protruding from the pocket 81.

Figure 2:
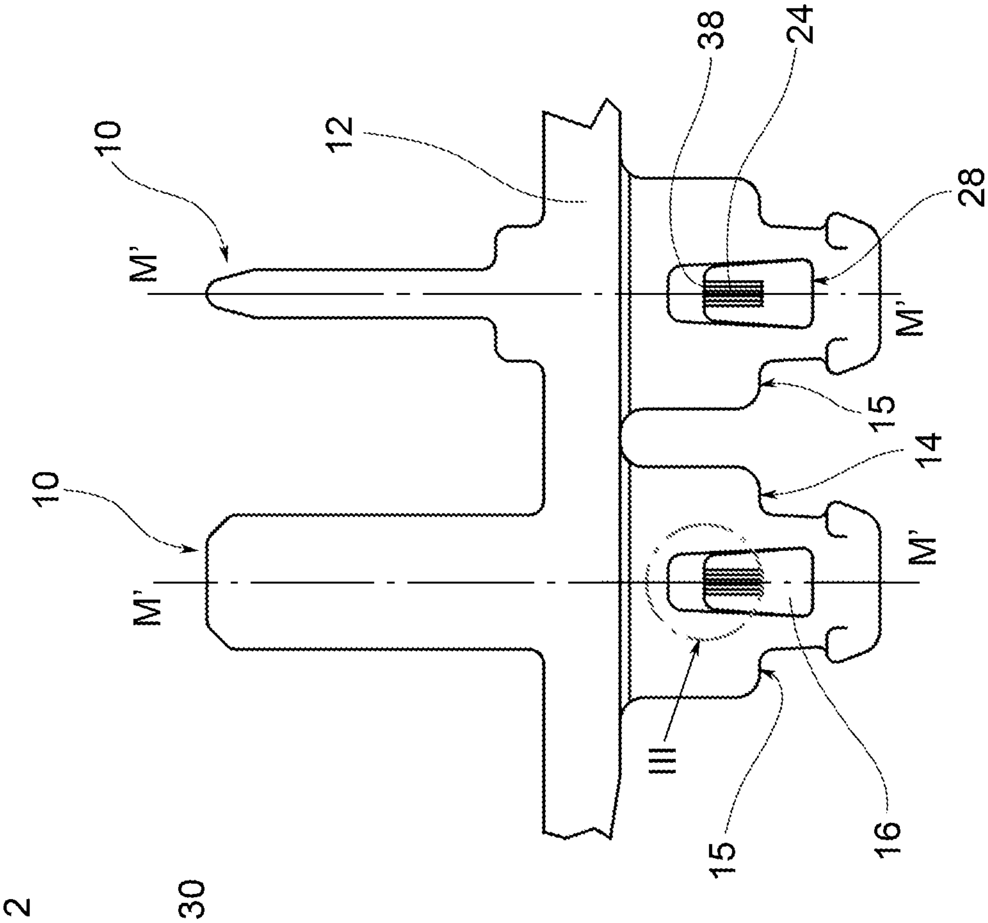
FIG. 2 is a front view of a pair of connection terminals.
Figure 3:
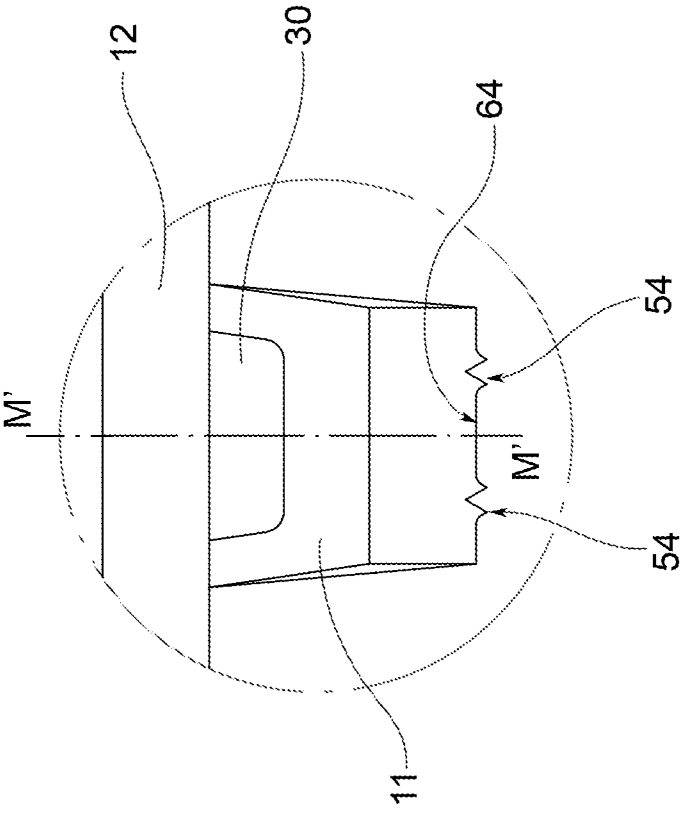
FIG. 3 is a top view of the detail III shown in FIG. 2.
Figure 3B:
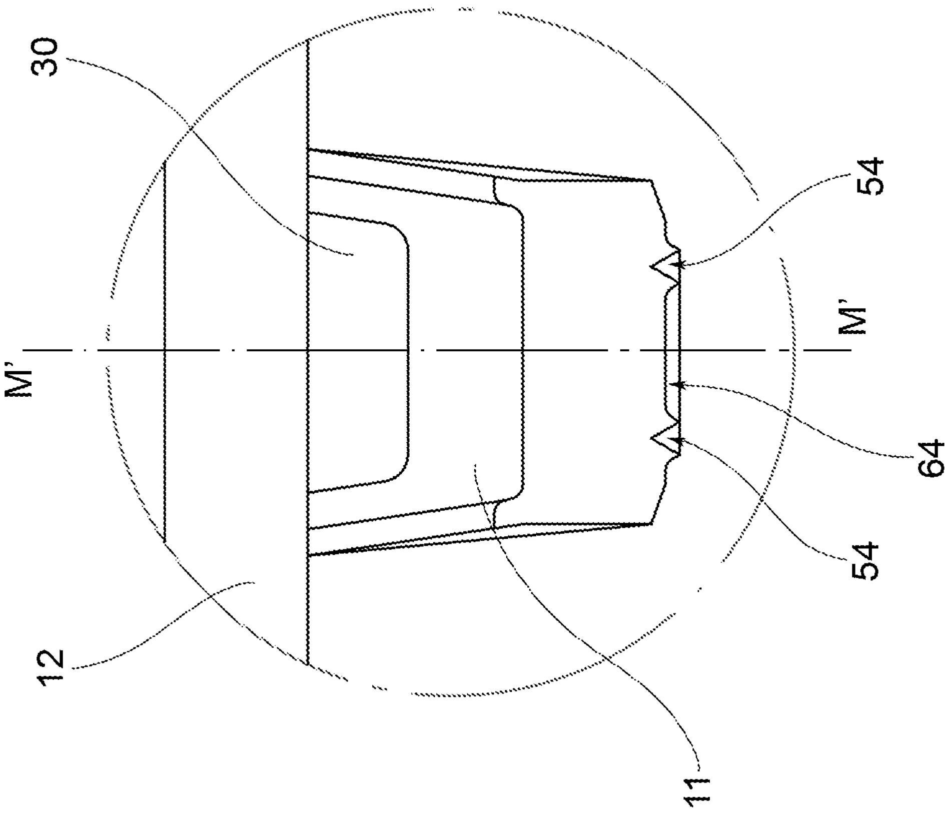
FIGS. 3*a-b* are exemplary embodiments of a shaped surface.
Figure 3A:
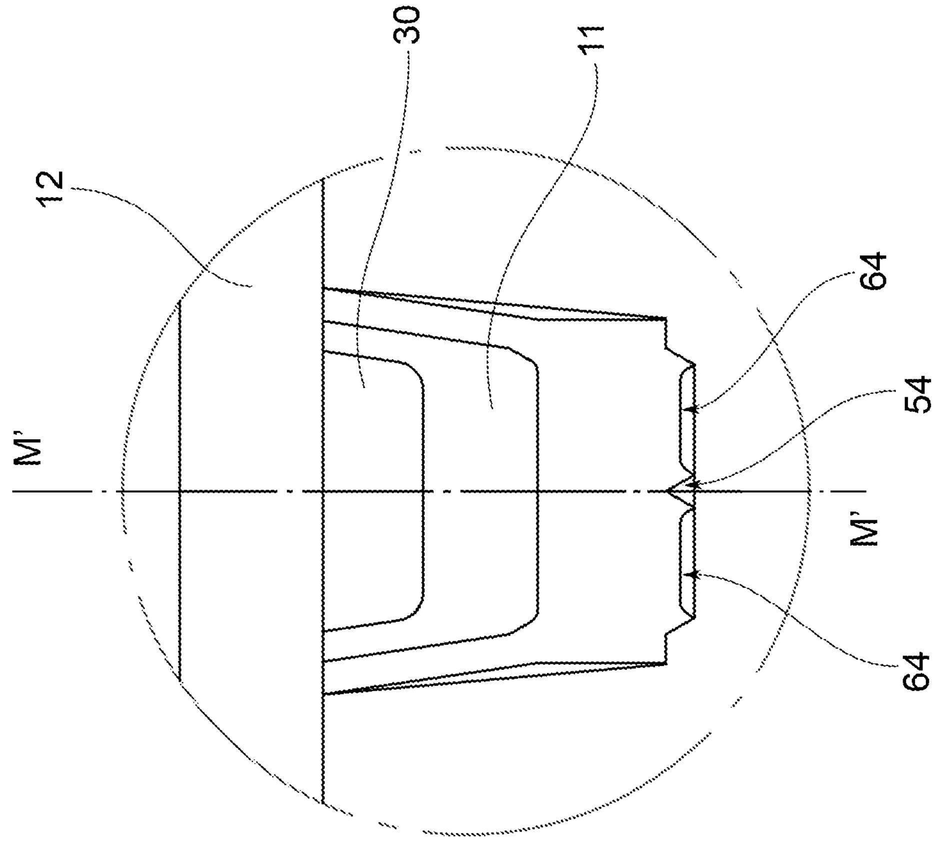

Preferably, the connection terminal 10 is formed in one piece together with at least one second connection terminal (FIG. 2) to form a connection terminal pair. In the connection terminal pair, one terminal is used as the input terminal and the second terminal is used as the output terminal.

Figure 4:
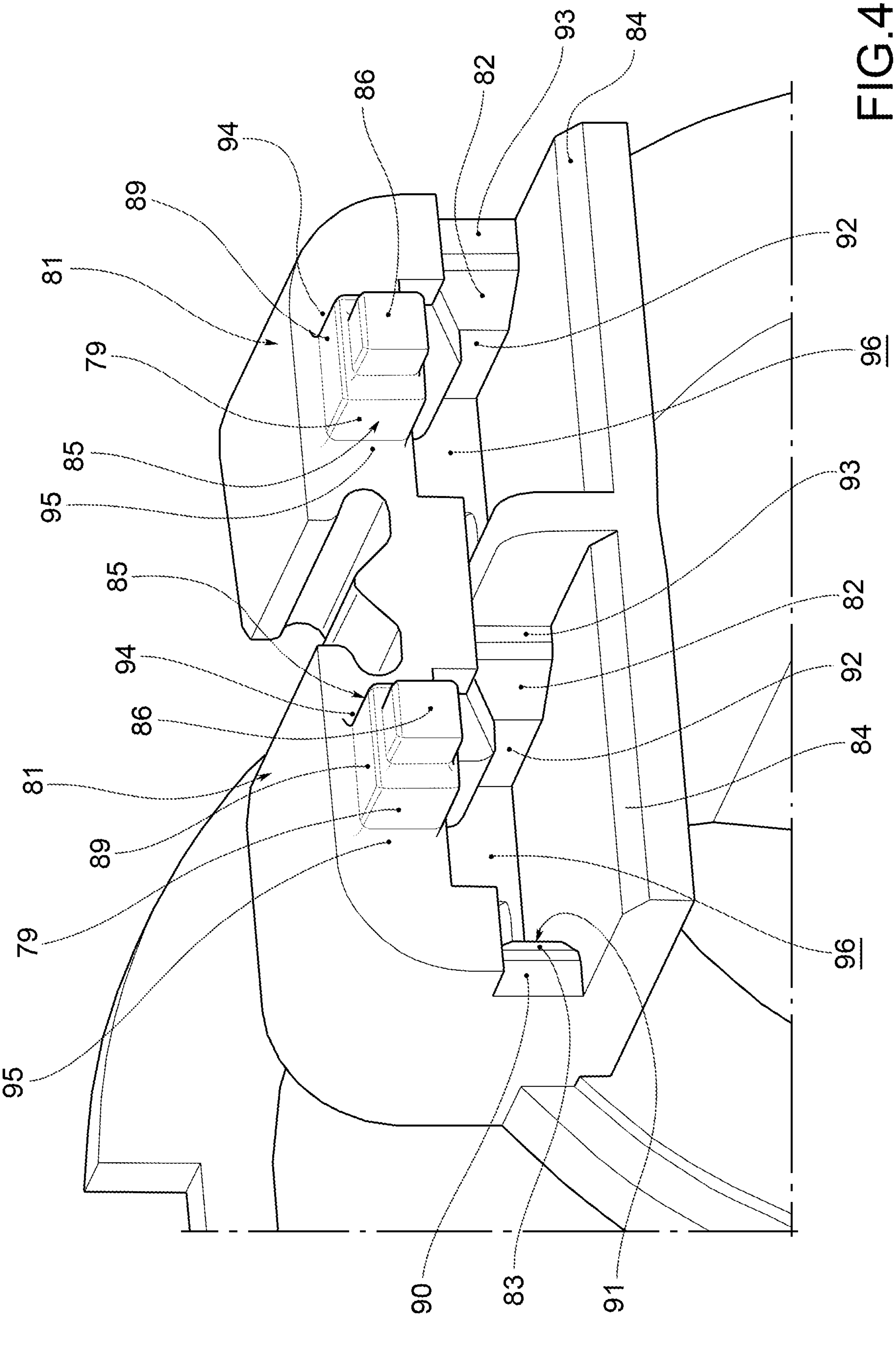
FIG. 4 is a perspective view of a pair of pockets.
Figure 5B:
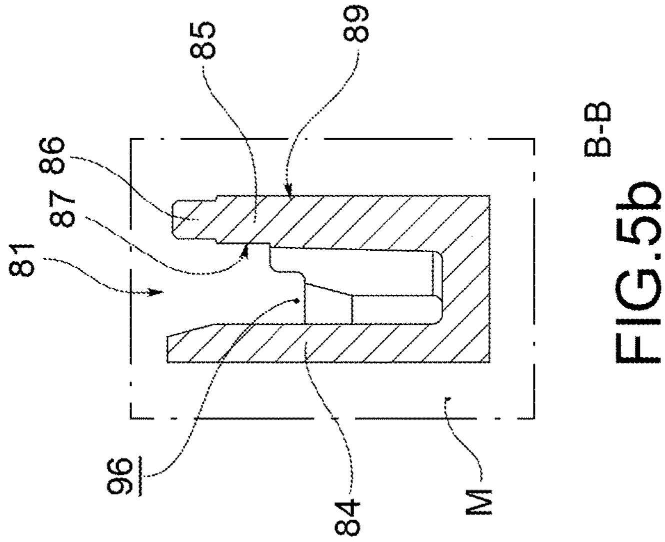
FIG. 5*b* is a cross-sectional view of the pocket from FIG. 5*a*, said cross section being taken along a section plane B-B.
Figure 5A:
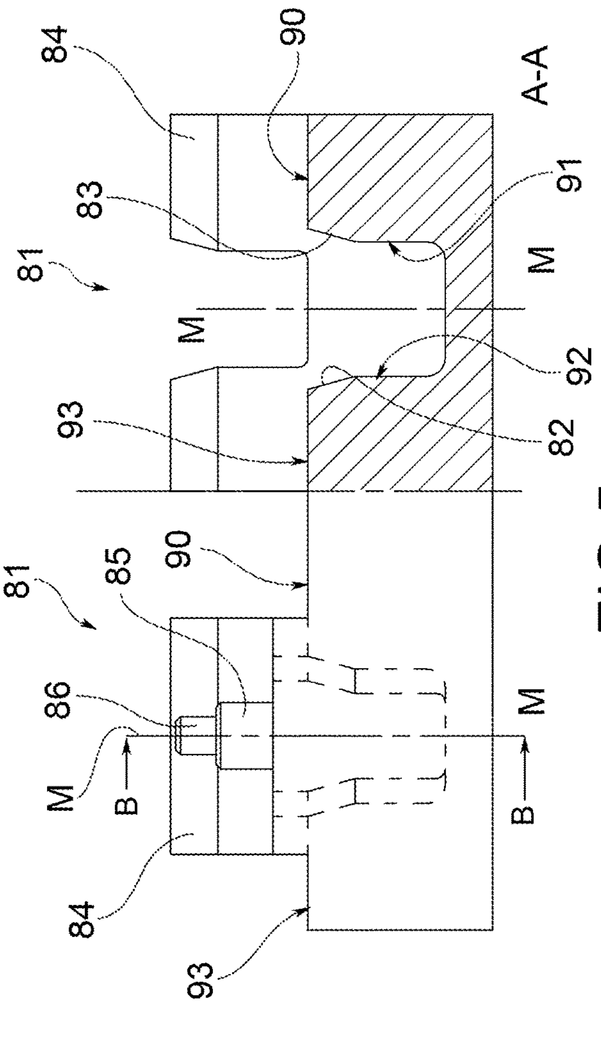
FIG. 5*a* is a partial cross-sectional front view of the pair of pockets from FIG. 5.
Figure 5:
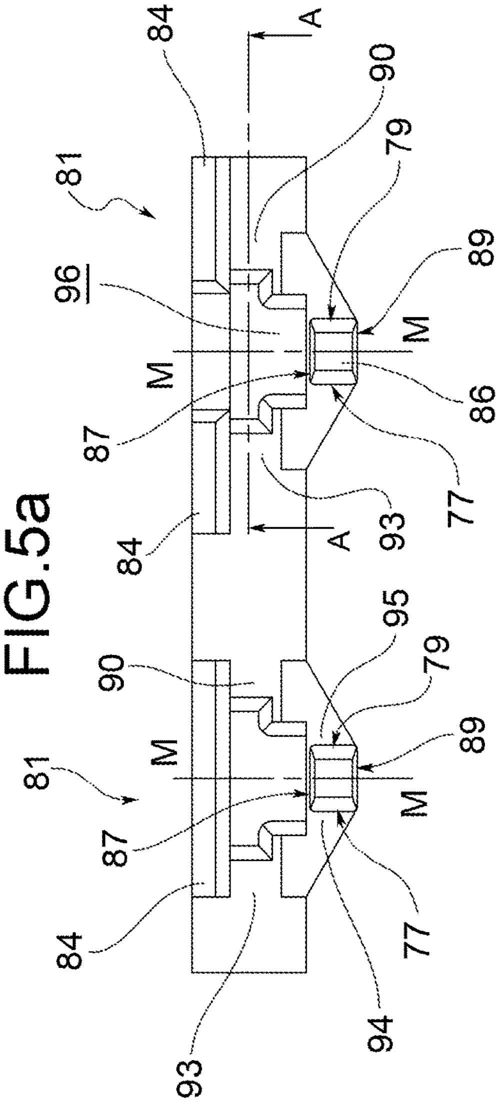
FIG. 5 is a top view of an additional pair of pockets.

Preferably, the pocket 81 is formed in one piece together with at least one second pocket (FIGS. 4 and 5-5*b*) so as to form a pocket pair. In the pocket pair, one pocket is used to accommodate the input terminal and the second pocket is used to accommodate the output terminal.

However, the connection system may comprise a plurality of terminals and a corresponding plurality of pockets, wherein each terminal of the plurality of terminals is provided with a single tab and each pocket of the plurality of pockets has a single pin that peripherally delimits the pocket together with the back wall and the pair of side guide walls. In addition, the number and shape of the plurality of terminals and also the number and shape of the plurality of pockets may be customized in accordance with customer requirements.

In particular, the pocket 81 is delimited frontally by the pin 85 which comprises at its base the pair of support walls 94, 95. This pair of support walls is respectively connected to the pair of stop surfaces 90, 93. In an embodiment, the support walls 94, 95 are coplanar to the stop surfaces 90, 93.

The assembly and operation of a connection system according to the invention will now be described.

The first operation is to wind the enameled wire 20 on the pin 85 of the pocket 81; starting from the upper pin 86, the enameled wire 20 is wound from top to bottom over the side walls 87 and 89 and connecting walls 77, 79 as far as the pair of support walls 94, 95; the winding direction is irrelevant.

Then the winding of the enameled wire 20 begins. After the winding is completed, the enameled wire 20 will be wound on the pin 85 of the second pocket 81, starting from the pair of support walls 94, 95 from the bottom to the top and ending on the upper pin 86.

The winding is now ready for connection to the terminal 10, where the electrical connection between the enameled wire 20 of the winding and the terminal 10 will be made mechanically, and in particular to the shaped surface 24 of the tab inside the pocket 81.

The terminal 10 is placed over the pocket 81; then, the terminal 10 starts to enter the pocket 81 (FIGS. 6*a*-*b*).

The bevels 82 and 83 help the terminal 10 enter the pocket 81, while the pair of side guide walls 91, 92 of the pocket 81 guide the terminal 10 to the operating position.

When the tab 16 of the terminal 10 meets the enameled wire 20 wound on the upper pin 86, said tab starts to creep over the enameled wire 20 and remove the enamel; the reaction of the pin 85 and of the enameled wire 20 causes the tab to tend to approach the body 12 by pivoting on the connection portion 28.

The tab 16 works like a spring, exerting a spring pressure on the enameled wire 20 against the pin 85.

Advantageously, due to the shaped surface 24, once the terminal 10 has arrived at the final operating position, the enameled wire 20 is etched with linear progression.

In fact, the enameled wire 20 is elastically stressed by the outer side 18 and supported by the pin 85.

This prevents the terminal 10 from cutting the enameled wire 20, and thus from interrupting the passage of current, and also provides a large contact area for the passage of said electric current with a realistic “gas-tight” seal.

Therefore, the pin 85 forms a column that has the dual function of providing the enameled wire 20 with a seat where it may be placed, keeping it taut, and then providing support for the wire 20 when the terminal 10 is inserted from above.

Advantageously, the wire 20 is not shear-stressed from top to bottom but in an oblique/sloping manner; the coils of the winding help the preceding coil, and the slope of the tab 16 also facilitates work on the wire 20 by creeping/sliding.

Moreover, the tab 16 is elastic and thus tends to expand/open, helped also by the pin 85, which increases the response of the enameled wire 20, which is wound over it, towards the terminal 10.

The terminal 10, even in its insertion phase, always encounters a different coil of enameled wire 20 wound on the pin 85, and this in turn responds as with the previous coils of the enameled wire 20.

In addition, due to the sloping shape of the tab 16, the topmost coils are more stressed while those at the foot of the pin 85 are not even touched.

Due to the shaping of the tab 16, the wire is stressed progressively. Depending on the different diameter of the wire, it is automatically restrained in abutment against the pin 85 by a winding/coiling machine, before being etched or abraded by the tab 16 during the insertion into the pocket 81. In any case, the continuity of electrical contact between the wire 20 and the terminal 10 is ensured.

This ensures that, during the insertion of the terminal 10 on the enameled wire 20 and on the pin 85, under no circumstances will the force of the tab 16 on the wire 20 and the continuity in the passage of current between the enameled wire 20 and terminal 10 be lost.

The constant force created by the terminal 10 on the wire/pin combination allows constant pressure to be maintained on the wire 20.

The result is a “gas-tight” electrical connection between the terminal 10 and the wire 20 that is reliable and ensured under the vibrations and thermal expansion that the connection system 100 may experience during use and that cause the wire 20 to expand and contract.

Innovatively, the insulation displacement connection system fulfills the intended purpose.

Advantageously, the connection terminal comprises a single tab, rather than at least two tabs, and this allows for a significant reduction in overall dimensions, that is to say, a reduction in the wire size-to-product ratio.

According to an advantageous aspect, winding of the wire is easier because the pin delimits the pocket and thus it is easier to proceed with winding the wire. By contrast, in the prior art, the pin was placed inside the pocket, for example centrally.

According to an even further advantageous aspect, the connection system ensures a reliable “gas-tight” electrical connection over a large wire cross section (wire diameter/contact length ratio) without a reduction of the diameter of the enameled wire.

Advantageously, the connection system is applicable to a whole range of products where, due to the need for limited overall dimensions, there is not enough space to insert a terminal with two contact ends.

According to an advantageous aspect, the connection system also allows a cost saving, because the terminal provides a single tab and the pocket is not subject to strict dimensional tolerances.

According to yet a further advantageous aspect, the connection system, in contrast to the traditional IDC systems, does not cut the wire, but merely removes the enamel and allows a large contact area. In this way, the system offers better resistance due to to stress vibration and/or thermal shock, especially in the automotive technical field.

In order to meet contingent needs, a person skilled in the art may make changes, adjustments and adaptations to the embodiments of the connection system according to the invention, and may make replacements of elements with other functionally equivalent elements, without departing from the scope of the following claims. Each of the features described as belonging to a possible embodiment may be obtained independently of the other described embodiments.

What is claimed is:

1. An insulation displacement connection system comprising:

a connection terminal;

a pocket suitable for accommodating said connection terminal; and an enameled wire spirally wound and at least partly accommodated in said pocket, wherein the pocket comprises a pin on which said enameled wire is wound, and wherein:

the pin is delimited by side walls that support the enameled wire during a winding of the enameled wire onto the pin, the pin comprising a midplane (M-M), the pocket is frontally delimited by the pin, at the back by a rear wall and laterally by a pair of side guide walls suitable for guiding the connection terminal during an insertion thereof of the connection terminal into the pocket, the connection terminal is provided with a single tab shaped to elastically intercept the pin so as to exert an abrasive action on the enameled wire during the insertion of the connection terminal into the pocket and so as to elastically bias the enameled wire to abut against the pin upon the insertion of said connection terminal into the pocket, ensuring an electrical connection between the single tab and the enameled wire, the single tab comprises an outer side suitable for intercepting the enameled wire, said outer side having a shaped surface which that directly interfaces with the enameled wire, said single tab further comprising a terminal midplane suitable for being coplanar to the midplane (M-M), and the pin, the rear wall and the pair of side guide walls delimit a cavity for accommodating the connection terminal, in particular the single tab.

2. The insulation displacement connection system of claim 1, wherein the connection terminal comprises a body and the single tab, said single tab extending from the body so as to remain facing the body, and wherein the outer side of the single tab has, along an extension thereof, an at least partly curvilinear development having a concavity directed towards the body of the connection terminal.

3. The insulation displacement connection system of claim 2, wherein the at least partly curvilinear development of the outer side of the single tab has an arc of parabola shape.

4. The insulation displacement connection system of claim 1, wherein the single tab extends between a connection portion and a free end, said connection portion connecting the single tab to the body so as to allow the single tab to elastically bend, pivoting on the connection portion.

5. The insulation displacement connection system of claim 3, wherein the single tab extends between a connection portion and a free end, said connection portion connecting the single tab to the body to allow the single tab to elastically bend, pivoting on the connection portion, and wherein the at least partly curvilinear development is such as to increase a mutual distance between the single tab and the body, moving from the connection portion towards the free end of the single tab.

6. The insulation displacement connection system of claim 4, wherein the single tab has, in the vicinity of the free end, a development substantially parallel to the body.

7. The insulation displacement connection system of claim 1, wherein the shaped surface comprises a plurality of contact areas alternated by a plurality of supporting areas, wherein the contact areas comprise contact tips obtained by molding and are suitable for breaking enamel to allow the electrical connection between the wire and the connection terminal, and wherein the supporting areas are portions of smooth surface configured as supporting points for the wire.

8. The insulation displacement connection system of claim 4, wherein the shaped surface extends from the connection portion up to the free end.

9. The insulation displacement connection system of claim 1, wherein the connection terminal further comprises a pair of pocket engagement surfaces oriented orthogonally to the terminal midplane and suitable to ensure correct positioning of the connection terminal in the pocket.

10. The insulation displacement connection system of claim 1, wherein the pin has a polygonal-shaped cross section, where wherein the side walls are connected to each other by connecting walls, and wherein one side wall of said side walls is counter-shaped with respect to the outer side so as to ensure a uniform support for the enameled wire, which is coaxially wound around the pin, during the insertion of the connection terminal.

11. The insulation displacement connection system claim 1, wherein the pin comprises an upper pin defining start and/or end position of the winding of the enameled wire.

12. The insulation displacement connection system of claim 11, wherein the upper pin is delimited by shaped walls suitable for locking the enameled wire during the winding so that the enameled wire does not unwind.

13. The insulation displacement connection system of claim 11- or 12, wherein the upper pin has a quadrangular shape with respect to a section plane perpendicular to the midplane.

14. The insulation displacement connection system of claim 11, wherein the upper pin has a reduced cross section than the one defined by the side walls, and wherein said reduced cross section of the upper pin is such as to facilitate work of the single tab during the insertion of the connection terminal up to an operating position.

15. The insulation displacement connection system of claim 1, wherein the pin is delimited at the bottom by a pair of support walls configured as a support base for the enameled wire, said pair of support walls providing a stop for the enameled wire spirally wound around the pin and preventing the enameled wire from laterally protruding from the pocket.

16. The insulation displacement connection system of claim 1, wherein said midplane (M-M) is a plane of symmetry for the pocket.

17. The insulation displacement connection system of claim 4, wherein said connection portion comprises an arc of circumference.

18. The insulation displacement connection system of claim 7, wherein said contact tips are alternating ridges and depressions.

19. The insulation displacement connection system of claim 17, wherein the shaped surface extends from the arc of circumference up to the free end.

20. The insulation displacement connection system of claim 10, wherein the pin has a quadrangular cross section.

* * * * *